United States Patent
Causey et al.

(10) Patent No.: US 7,952,476 B1
(45) Date of Patent: May 31, 2011

(54) MOBILE SECURITY SYSTEM

(75) Inventors: Mark Edward Causey, Tucker, GA (US); Scott Andrus, Prior Lake, MN (US); Adrianne Binh Luu, Roswell, GA (US); Kevin W. Jones, St. Louis Park, MN (US); Coulter C. Henry, Jr., Marietta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 217 days.

(21) Appl. No.: 11/844,594

(22) Filed: Aug. 24, 2007

(51) Int. Cl.
G08B 1/08 (2006.01)

(52) U.S. Cl. ......... 340/539.17; 340/539.11; 340/539.13; 340/506; 340/517; 340/539.1; 340/539.22; 340/539.25; 340/539.26; 340/545.2

(58) Field of Classification Search .............. 340/539.1, 340/539.11, 539.13, 539.17, 426.1, 426.2, 340/506, 517, 539.22, 539.25, 539.26, 541, 340/545.2, 545.1, 565
See application file for complete search history.

(56) References Cited

U.S. PATENT DOCUMENTS

| | | | | |
|---|---|---|---|---|
| 5,959,529 A * | 9/1999 | Kail, IV | ................... | 340/539.12 |
| 6,184,801 B1 * | 2/2001 | Janky | ............................ | 340/988 |
| 6,741,165 B1 * | 5/2004 | Langfahl et al. | ........... | 340/426.1 |
| 6,831,556 B1 * | 12/2004 | Boykin | ....................... | 340/539.1 |
| 6,956,467 B1 * | 10/2005 | Mercado, Jr. | .............. | 340/426.2 |
| 6,975,223 B1 | 12/2005 | Mladen et al. | ........... | 340/539.14 |
| 7,026,928 B1 | 4/2006 | Lane | ........................ | 340/539.13 |
| 7,129,838 B2 * | 10/2006 | Shimomura et al. | .......... | 340/541 |
| 2009/0058634 A1 * | 3/2009 | Maltseff et al. | .......... | 340/539.11 |
| 2009/0191839 A1 * | 7/2009 | Cannon, Jr. | ................ | 455/404.1 |
| 2009/0203349 A1 * | 8/2009 | Hollstien | .................. | 455/404.1 |
| 2010/0035648 A1 * | 2/2010 | Huang | ....................... | 455/556.1 |

* cited by examiner

Primary Examiner — Daryl Pope
(74) Attorney, Agent, or Firm — Woodcock Washburn LLP

(57) ABSTRACT

A mobile security system is described herein. A detector communicates with a mobile device if an event has occurred. The event may be various types of events, such as fire or motion. Once the mobile device receives the communication of the event occurrence, the mobile device may, among others, sound an alarm or communicate with a central monitoring system to notify emergency services of the occurrence. The mobile device may also communicate with another communication device, such as another cell phone or a computer, using various forms of communication. The detector may be an integral part of the mobile device, i.e. fixed part of the mobile device, or may be detachable. The detector may also be wholly separate.

25 Claims, 8 Drawing Sheets

MOBILE SECURITY SYSTEM

BACKGROUND

It is often desirable to secure a room or an enclosure from intrusion by an unauthorized person, such as a burglar. At a basic level, a door or removable entryway may be used to provide a minimal level of security, blocking the site of contents of the room from prying eyes, and thus, reducing the risk of a break-in by removing immediate knowledge of the contents. While perhaps effective at some level, the placement of a simple barrier to viewing becomes irrelevant if the intruder has prior knowledge, or some belief, that the room contains something of value. Additional security measures are often used, usually in the form of a lock to the door or removable entryway, creating an additional barrier to entry. Locks range in complexity and effectiveness, from simple clasps to hardened metal bolts. While door locks may provide an effective means for securing a room or enclosure, there are a myriad of ways available to a person to break into the enclosure. Additionally, because they are a physical structure, door locks do not represent an impossible barrier to the clever or determined intruder.

In order to provide for some level of security beyond a door and door lock, a two part security system is often used, one of prevention and detection. The purpose of the door and the door lock is to attempt to prevent the entry of the intruder by placing some physical barrier between the room and the intruder. Thus, the intruder has to exert some level of force to enter into the room when secured by a locking mechanism. The other part of the security equation is detection. If the intruder knows that their entrance is either detectable or has been detected, even if the intruder is able to enter the secured space, the threat of capture by the police and prosecution in a court of law works to erect a mental barrier to entry.

Perhaps the most common detection system is an alarm system. In the context of a house, the alarm is typically connected to all doors and windows on the ground level. If anyone of the doors or windows is opened while the alarm is activated, an audible alarm will typically sound. In most home alarm systems, the alarm is also connected to a central monitoring system. If the alarm is tripped, a signal is sent, typically through the telephone land line, to the central monitoring system. If the owner of the home does not respond to a callback from the central monitoring system in a proper way, either by answering the callback or repeating a pre-determined password, the central monitoring system usually will notify police of the potential intrusion.

While somewhat effective in protecting a home or office from intrusion, the security system is typically immobile and is setup for a specific use, i.e. the home or office. Because people are becoming more mobile while the threat of crime is not significantly diminishing, the single purpose security system is of no use to an individual other than the location of installation. When traveling, safety is often a primary concern of the individual, often influencing the location the person stays as well as the location within the location the person stays. For example, for personal safety reasons, it may not be preferable to book a hotel room in an area of a city notorious for crime. Additionally, a person may wish to request a hotel room a significant distance from the fire escape stairwell, as studies show a significant portion of break-ins occur next to the stairwell.

Even though an individual may take these and other precautions when traveling, such as locking the door, the feeling of security when a room or dwelling is protected by an alarm system may be desirable even when traveling. Thus, there is a need to provide for a security system that is mobile and convenient for travel.

SUMMARY

Electronic devices that are carried by an individual when traveling or when moving from place to place are combined with detection systems for detecting intruders. For example, a cell phone may have a motion detector. An individual, when wishing to secure a room, may place the cell phone in a configuration that allows the detector to detect movement coming from a doorway or other likely entry point. Additionally, the cell phone may be integrated with a central monitoring system that may monitor the detector, determine possible intrusions, and report the possible intrusions to police. Various detectors may be used, including motion, heat, light, sound and vibration. Additionally, the detector may be an integral part of the electronic device or may be a separate component in communication with the device.

An exemplary and non-limiting embodiment may include a mobile device having a detector configured to detect an unauthorized presence. In another exemplary and non-limiting embodiment, the electronic device may be in communication with a detector that is either temporarily or permanently detachable from the electronic device or is a separate component from the electronic device. In another exemplary and non-limiting embodiment, the electronic device is configured to autonomously communicate an alarm.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The foregoing summary, as well as the following detailed description of preferred embodiments, is better understood when read in conjunction with the appended drawings. For the purposes of illustration, there is shown in the drawings exemplary embodiments; however, these embodiments are not limited to the specific methods and instrumentalities disclosed. In the drawings.

DETAILED DESCRIPTION

The subject matter of the described embodiments is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described. It should be understood that the explanations illustrating data or signal flows are only exemplary. The following description is illustrative and non-limiting to any one aspect.

Network Architecture Overview

Figure 1:
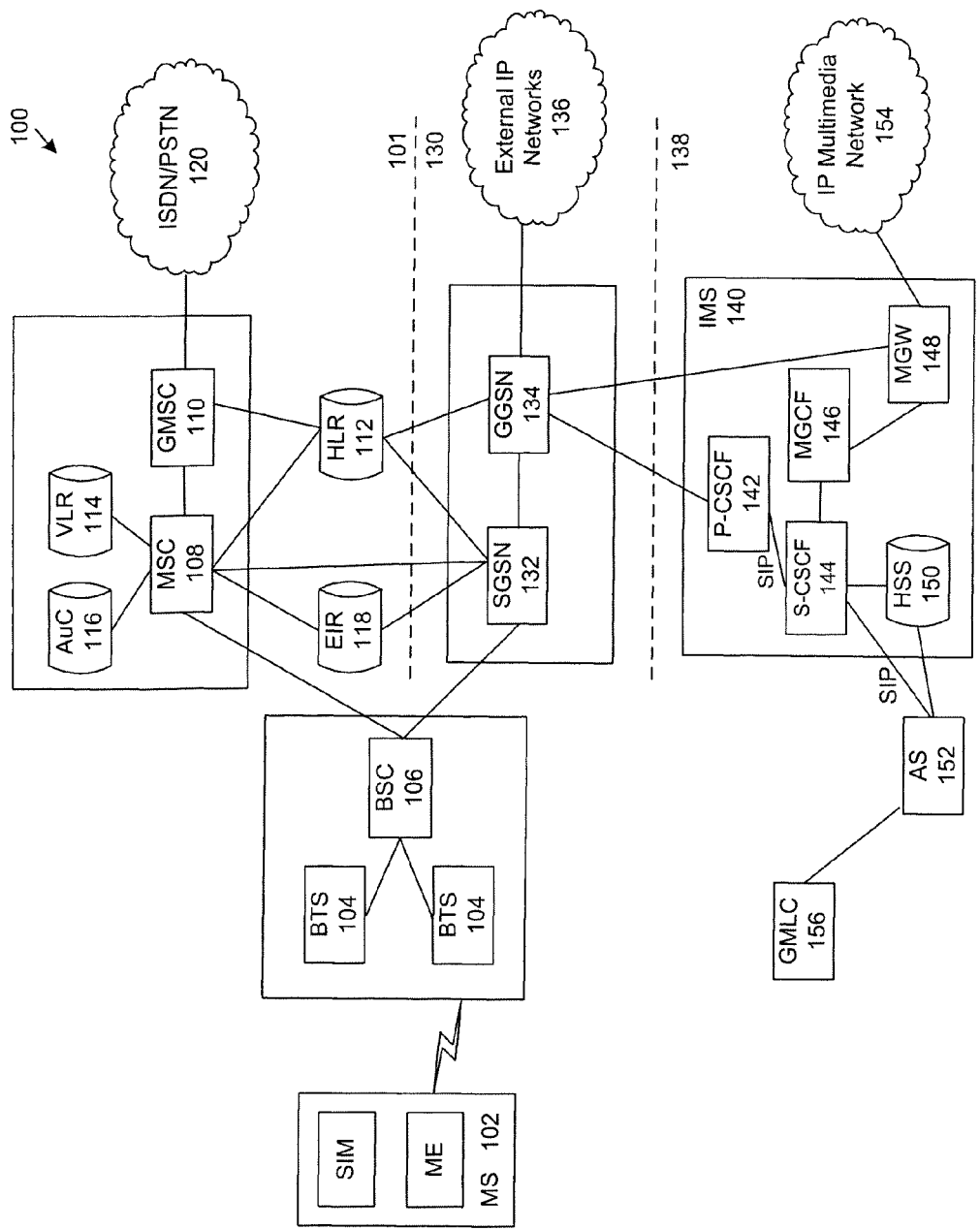
FIG. 1 illustrates an exemplary GSM/GPRS/IP multimedia network architecture.

FIG. 1 shows a GSM/GPRS/IP multimedia network architecture 100 which includes a GSM core network 101, a GPRS network 130 and an IP multimedia network 138. The GSM core network 101 includes a Mobile Station (MS) 102, at least one Base Transceiver Station (BTS) 104 and a Base Station Controller (BSC) 106. The MS 102 is physical equipment or Mobile Equipment (ME), such as a mobile phone or a laptop computer that is used by mobile subscribers, with a Subscriber identity Module (SIM). The SIM includes an International Mobile Subscriber Identity (IMSI), which is a unique identifier of a subscriber. The BTS 104 is physical equipment, such as a radio tower, that enables a radio interface to communicate with the MS. Each BTS may serve more than one MS. The BSC 106 manages radio resources, including the BTS. The BSC may be connected to several BTSs. The BSC and BTS components, in combination, are generally referred to as a base station (BSS) or radio access network (RAN) 103.

The GSM core network 101 also includes a Mobile Switching Center (MSC) 108, a Gateway Mobile Switching Center (GMSC) 110, a Home Location Register (HLR) 112, Visitor Location Register (VLR) 114, an Authentication Center (AuC) 118, and an Equipment Identity Register (EIR) 116. The MSC 108 performs a switching function for the network. The MSC also performs other functions, such as registration, authentication, location updating, handovers, and call routing. The GMSC 110 provides a gateway between the GSM network and other networks, such as an Integrated Services Digital Network (ISDN) or Public Switched Telephone Networks (PSTNs) 120. In other words, the GMSC 110 provides interworking functionality with external networks.

The HLR 112 is a database that contains administrative information regarding each subscriber registered in a corresponding GSM network. The HLR 112 also contains the current location of each MS. The VLR 114 is a database that contains selected administrative information from the HLR 112. The VLR 114 contains information necessary for call control and provision of subscribed services for each MS currently located in a geographical area controlled by the VLR. The HLR 112 and the VLR 114, together with the MSC 108, provide the call routing and roaming capabilities of GSM. The AuC 116 provides the parameters needed for authentication and encryption functions. Such parameters allow verification of a subscriber's identity. The EIR 118 stores security-sensitive information about the mobile equipment.

To gain access to GSM services, such as speech, data, and short message service (SMS), the MS first registers with the network to indicate its current location by performing a location update and IMSI attach procedure. The MS 102 sends a location update including its current location information to the MSC/VLR, via the BTS 104 and the BSC 106. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 130 is logically implemented on the GSM core network architecture by introducing two packet-switching network nodes, a serving GPRS support node (SGSN) 132 and a Gateway GPRS support node (GGSN) 134. The SGSN 132 is at the same hierarchical level as the MSC 108 in the GSM network. The SGSN controls the connection between the GPRS network and the MS 102. The SGSN also keeps track of individual MS's locations and security functions and access controls. The GGSN 134 provides a gateway between the GPRS network and a public packet network (PDN) or other IP networks 136. That is, the GGSN provides interworking functionality with external networks, and sets up a logical link to the MS through the SGSN. When packet-switched data leaves the GPRS network, it is transferred to an external TCP-IP network 136, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, arc the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 130 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not received pages from a circuit switched domain when engaged in a data call, since the MS is receiving data and is not listening to a paging channel In a NOM3 network, a MS can monitor pages for a circuit switched network while received data and vise versa.

The IP multimedia network 138 was introduced with 3GPP Release 5, and includes an IP multimedia subsystem (IMS) 140 to provide rich multimedia services to end users. A representative set of the network entities within the IMS 140 are a call/session control function (CSCF), a media gateway control function (MGCF) 146, a media gateway (MGW) 148, and a master subscriber database, called a home subscriber server (HSS) 150. The HSS 150 may be common to the GSM network 101, the GPRS network 130 as well as the IP multimedia network 138.

The IP multimedia system 140 is built around the call/session control function, of which there are three types: an interrogating CSCF (I-CSCF) 143, a proxy CSCF (P-CSCF) 142, and a serving CSCF (S-CSCF) 144. The P-CSCF 142 is the MS's first point of contact with the IMS 140. The P-CSCF 142 forwards session initiation protocol (SIP) messages received from the MS to an SIP server in a home network (and vice versa) of the MS. The P-CSCF 142 may also modify an outgoing request according to a set of rules defined by the network operator (for example, address analysis and potential modification).

The I-CSCF 143, forms an entrance to a home network and hides the inner topology of the home network from other networks and provides flexibility for selecting an S-CSCF. The I-CSCF 143 may contact a subscriber location function (SLF) 145 to determine which HSS 150 to use for the particular subscriber, if multiple HSS's 150 are present. The S-CSCF 144 performs the session control services for the MS 102. This includes routing originating sessions to external networks and routing terminating sessions to visited networks. The S-CSCF 144 also decides whether an application server (AS) 152 is required to receive information on an incoming SIP session request to ensure appropriate service handling. This decision is based on information received from the HSS 150 (or other sources, such as an application server 152). The AS 152 also communicates to a location server 156 (e.g., a Gateway Mobile Location Center (GMLC)) that provides a position (e.g., latitude/longitude coordinates) of the MS 102.

The HSS 150 contains a subscriber profile and keeps track of which core network node is currently handling the subscriber. It also supports subscriber authentication and authorization functions (AAA). In networks with more than one HSS 150, a subscriber location function provides information on the HSS 150 that contains the profile of a given subscriber.

The MGCF 146 provides interworking functionality between SIP session control signaling from the IMS 140 and ISUP/BICC call control signaling from the external GSTN networks (not shown). It also controls the media gateway (MGW) 148 that provides user-plane interworking functionality (e.g., converting between AMR- and PCM-coded voice). The MGW 148 also communicates with other IP multimedia networks 154.

Mobile Security Device

A mobile security system preferably has a detector and means for communicating a detected event. That communication may be of various types, including, but not limited to, and audible alarm or a communication sent to a pre-determined destination. To detect an intrusion, a detector is used that preferably detects a change in the room, such as sound, heat, light, infrared, vibration, etc. There are several ways in which to detect a disturbance. The present disclosure is not limited to any particular type of detector, but rather, may use any one or combination of detectors to detect an intrusive event.

Figure 2:
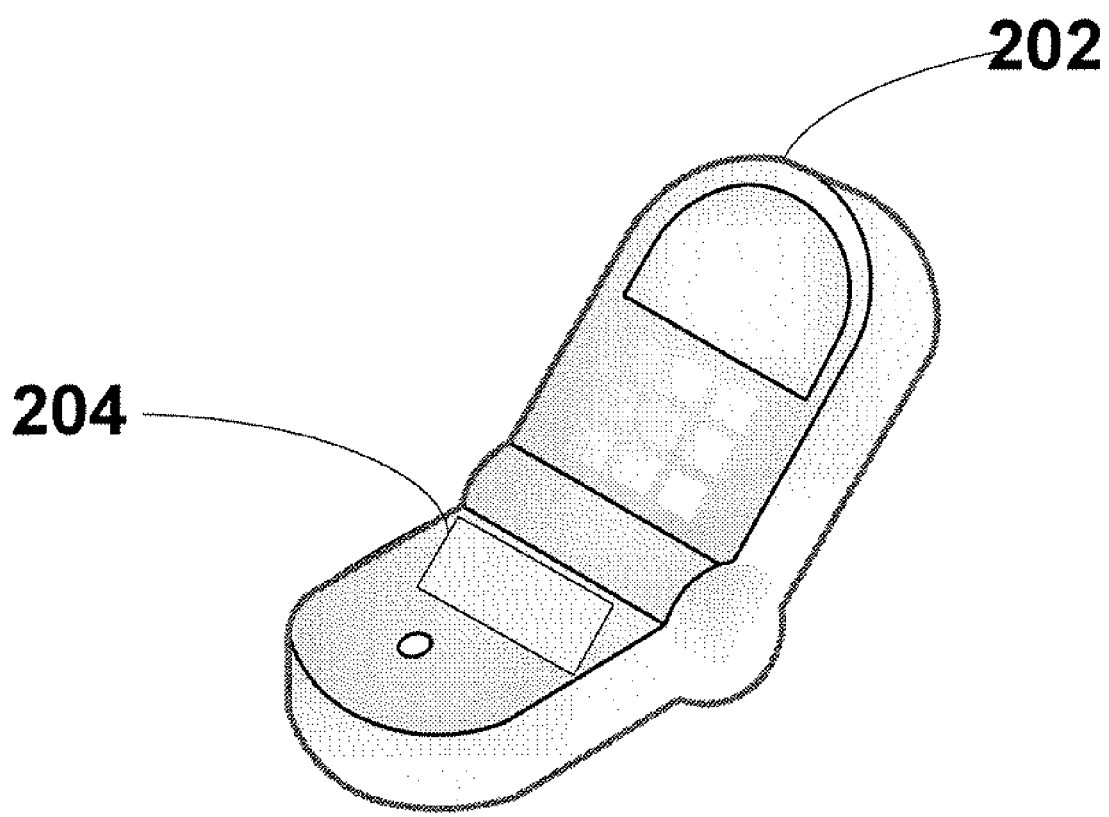
FIG. 2 is an exemplary and non-limiting diagram illustrating an electronic device having an integrated sensor for use in a mobile security system.

Shown in FIG. 2 is exemplary mobile security device 200. Because cellular telephones are so pervasive and are commonly used when traveling, the cellular telephone may be one platform to support mobile security device 202. Other mobile devices may be acceptable as well, including, but not limited to, a personal computer or a personal data assistant. For the purposes of the following description, the mobile platform of a cellular telephone is used. Thus, in FIG. 2, shown is cellular telephone 202, which provides for both a mobile platform, and depending upon the configuration, communication capabilities as discussed above.

To detect an intrusive event, cellular telephone 202 has detector 204. As previously discussed, there are several ways in which to detect an intrusive event. For the purpose of the following description only, detector 204 is a passive infrared motion sensor. This type of sensor does not emit signals, but rather, detects changes in temperature caused by heat emitting objects, such as a human body, passing within range of its sensors. Because a cellular telephone has limited battery life, a passive sensor may be a preferable option, though active sensors such as ultrasonic or microwave may also be configured for use. In FIG. 2, detector 204 is integrated with cellular telephone 202, i.e. detector 204 is a fixed component of cellular telephone 202.

Figure 3:
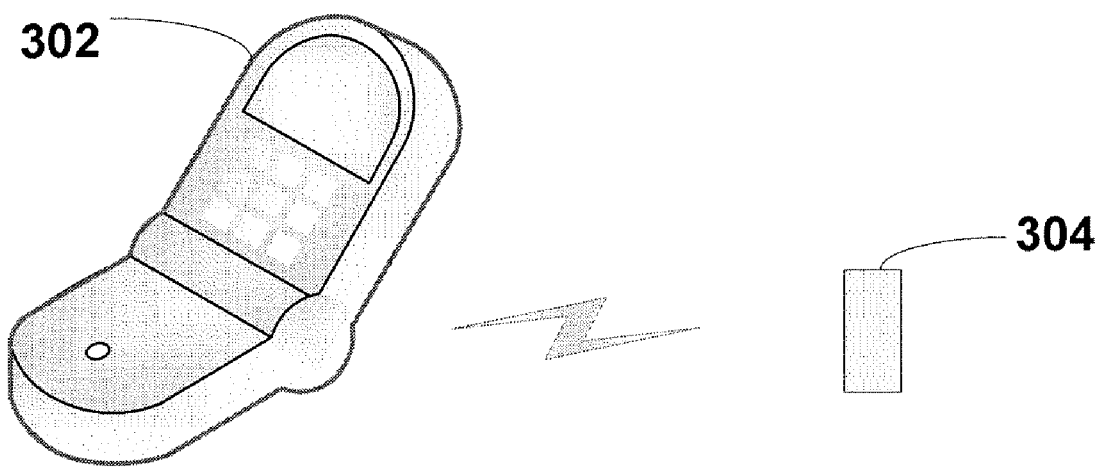
FIG. 3 is an exemplary and non-limiting diagram illustrating an electronic device having a detached sensor.

A detachable or wholly separate detector may be preferable in situations where the user wishes to position the mobile device away from a detection area or keep the mobile device on their person. Additionally, a detachable or separate sensor may be preferable when more than one sensor is needed or desired to secure an enclosure. FIG. 3 illustrates an exemplary mobile security system utilizing a detachable or non-integrated sensor. Mobile security system 300 has detector 304 in communication with cellular telephone 302. Detector 304, though shown as a separate component of system 300, may be detachable from cellular telephone 302. For example, cellular telephone 302 may have a slot or recess (not shown) in which to receive detector 304 for the purpose of storage. Additionally, when inserted into the recess, detector 304 may also be configured to operate while inserted, thus allowing a use similar to the security system described in FIG. 2 above.

In another example, detector 304 may be wholly separate from cellular telephone 302. For example, a user which has purchased cellular telephone 302 may want to utilize the capabilities of detector 304. The user may go to a store and purchase detector 304. Additionally, if more than one detector is needed or desired, the user may purchase additional detectors to supplement or augment a single detector, as described more fully in FIG. 7 below.

Figure 3A:
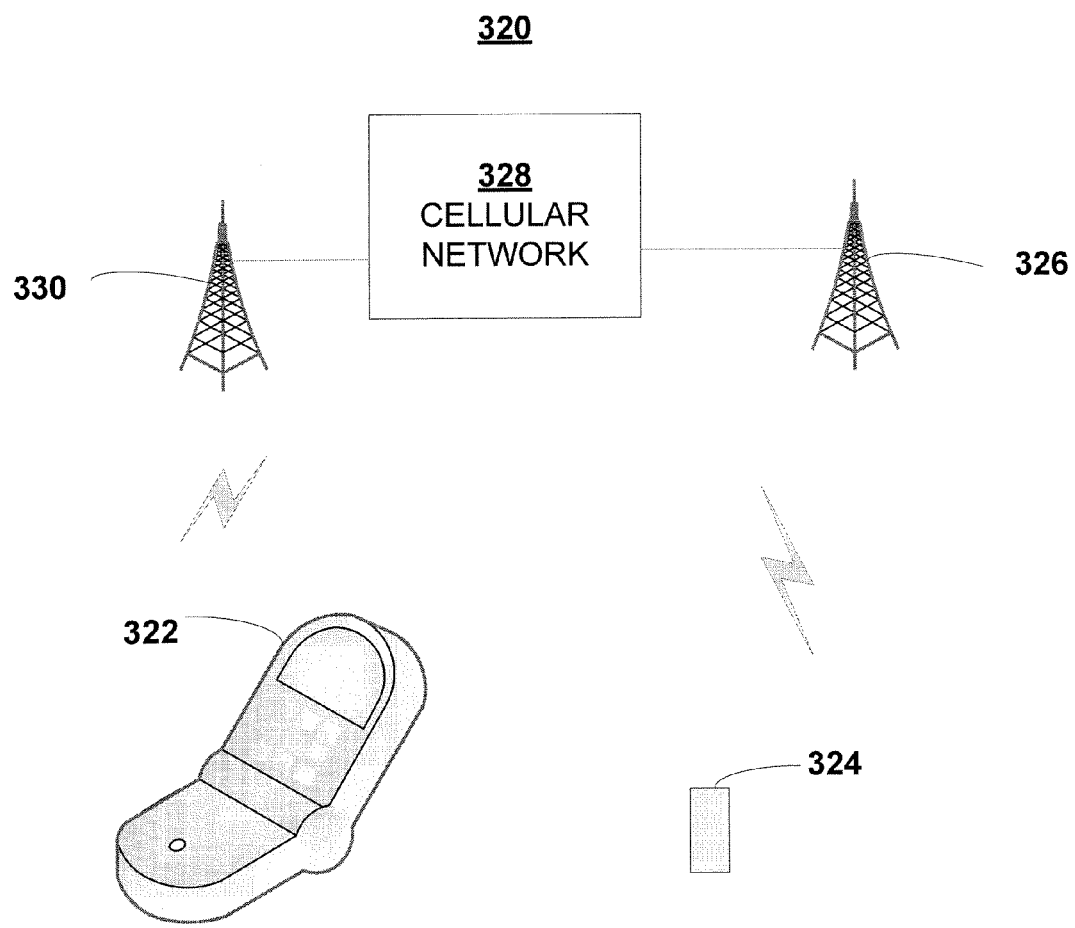
FIG. 3a is an exemplary and non-limiting diagram illustrating alternate means of communication between a sensor and an electronic device.

There are a myriad of ways in which detector 304 may communicate with cellular phone 300. For example, if cellular telephone is within a certain distance, detector 302 may be in communication with cellular telephone 300 via the use of a Bluetooth® or 802.x connection. If the detector and the mobile device are outside of certain ranges, the detector may communicate with the mobile device using other protocols of communication. FIG. 3a is illustrative of a device outside of a range that allows for direct communication between the detector and a mobile device. In this example, the detector may have been positioned outside of direct communication range or lost a direct communication link due to either physical barriers erected or communication faults.

To maintain communication between the detector and the mobile device, shown are cellular telephone 322 and sensor 324, both with cellular capabilities. If sensor 324 is in a position that does not allow for direct communication between sensor 324 and cellular telephone 322, sensor 324 may be configured to automatically switch communication from direct to indirect via an alternate means. In FIG. 3a, sensor 324 is configured with cellular capabilities that allow it to attempt to communicate with cellular telephone 322 if an event is detected. Sensor 324 may be programmed to establish communication with a pre-determined device, such as cellular telephone 322.

The communication path may be established under various circumstances, including, but not limited to, a loss of direct communication with cellular telephone 324, a detected event, or upon initial configuration, i.e. the sensor is positioned in a location that does not permit direct communication. In FIG. 3a, detector communicates with cellular telephone 322 via transceivers 326 and 330 vis-á-vis cellular network 320. The communication path between cellular telephone 322 and sensor 324 may be permanent or temporary. In other words, to increase battery life, sensor 324 may attempt to revert back to, if previously established, or use direct communication first. If unsuccessful in opening a direct communication path, sensor 324 may attempt to use an indirect communication path, such as the one described above.

Figure 4:
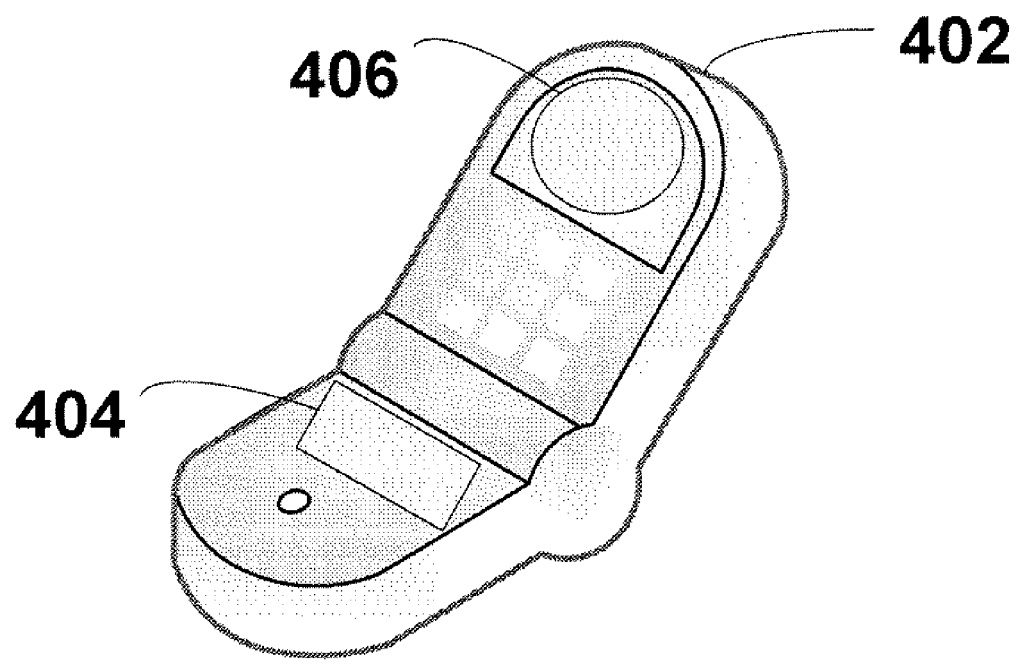
FIG. 4 is an exemplary and non-limiting diagram illustrating an electronic device having an integrated sensor and video camera.

The use may wish to augment a sensor with additional capabilities, or use various sensors for multiple purposes. For example, is a sensor detects an event, the user may wish to record video or take pictures of the area in which the event occurred. FIG. 4 is illustrative of an exemplary mobile security device that facilitates supplemental capabilities. Shown is cellular telephone 400 with detector 402. Cellular telephone 400 also has camera 404. An exemplary scenario in which the device of FIG. 4 may be used is in a home. The user will place cellular telephone 400 in a position so that detector 402 may sense an intrusive event. Upon detection of an intrusive event, cellular telephone 400 is configured to place camera 404 in an operational status to take video of the area. The video may be stored in memory on cellular telephone 400 or may be automatically transmitted to a remote location, such as a central storage locker provided by a cellular network. The user may be able to use the video to determine who or what caused the intrusive event and possibly use the video for enforcement purposes. As with FIGS. 2 and 3 above, sensor 402 and camera 404 may be physically integrated with cellular telephone 400, as shown by example in FIG. 2, or may be detachable or wholly separate, as shown by example in FIG. 3.

Figure 5:
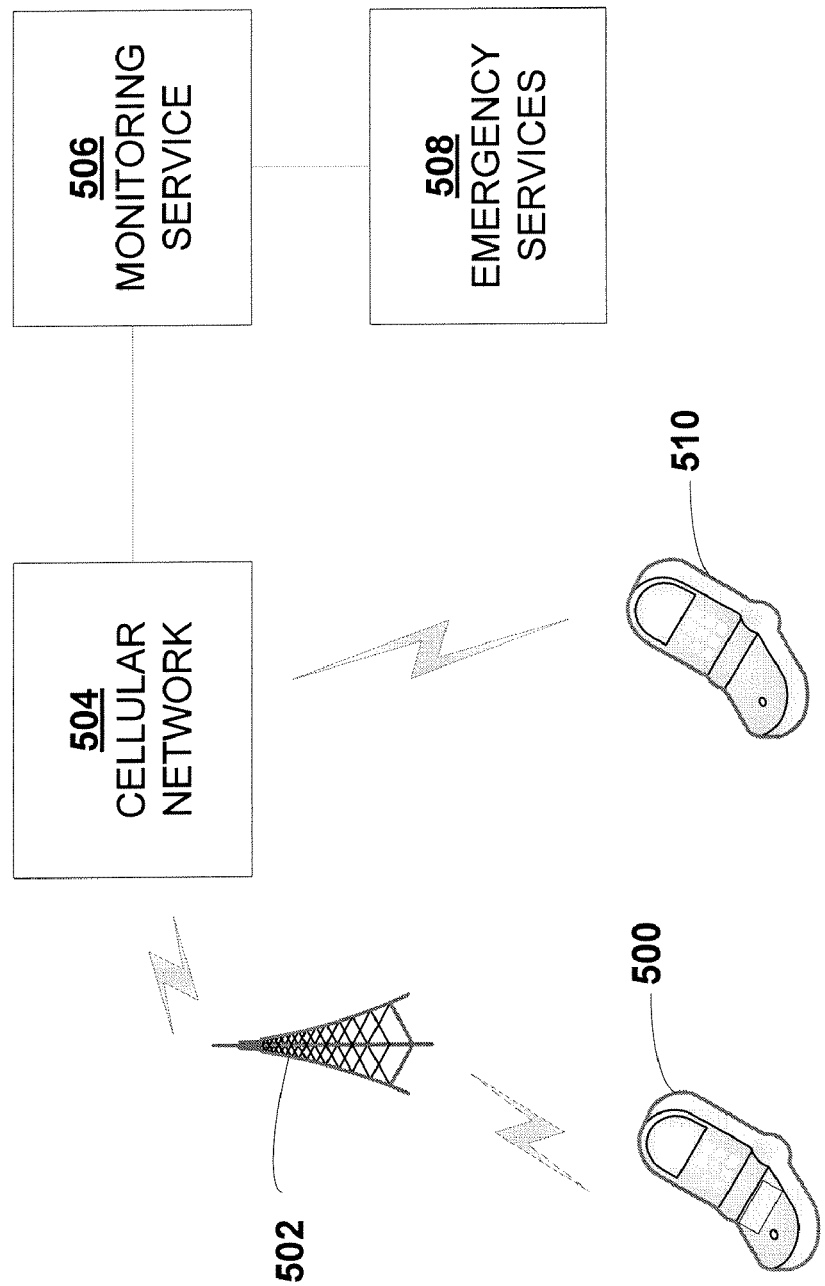
FIG. 5 is an exemplary and non-limiting diagram illustrating a mobile security system in communication with a cellular network.

Although detection and recording of intrusive events may be useful, the user may also want to report such events to local authorities, such as the police. In a home security system, upon the detection of an event, such as a door opening or a window breaking, when the security system is active, commonly the detected event will cause the system to communicate the occurrence of the event with a central monitoring station. FIG. 5 is an exemplary mobile security system that utilizes a monitoring service to provide additional security measures. Mobile security device 500 has an integrated sensor used to detect intrusive events, such as a door opening or a heat emitting body moving within range. Mobile security device 500 also has cellular communication capabilities to communication over a cellular network. Although mobile security device 500 may be of various types, for the purposes of this example only, mobile security device 500 is a cellular telephone with an integrated sensor, similar to the device described in FIG. 2 above.

Upon the detection of an event, mobile security device 500 opens a communication channel with monitoring service 506 via cellular network 504 and cellular transceiver 502. Once the communication channel is established, mobile security device 500 sends a detection signal to monitoring service 506. Upon receipt of the detection signal, monitoring service may verify the authenticity of the detection signal. Various methods may be used, including a call back to a telephone number, including mobile security device 500. If the alarm is authentic, or contact with mobile security device 500, or other contact means, is unsuccessful, monitoring service 506 may notify emergency services 508, such as the police. Emergency services 508 may also include a fire department if the detector of mobile security device 500 is configured to detect smoke or a fire.

Although it may be preferable to alert authorities immediately when an event is detected, a user may wish to be notified before, with, or in lieu of notification of emergency services 508. Second communication device 510 is provided as an additional, alternate or primary communication recipient resulting from the receipt of a detection signal. Communication device 510 may be another cell phone, wired phone, or computer. Additionally, the communication may take several forms because the user of communication device 510 may wish to know additional information beyond the notification of the detection of an event. Such additional information may be the time and type of detected event. For example, the communication may be a text message to communication device 510 stating that the detected event occurred at a certain time and that the detected event was a fire. The communication may also be a multimedia message sent to communication device 510. for example, if security device 500 is configured to record video upon the detection of an event, the video may be sent to communication device 500.

Figure 6:
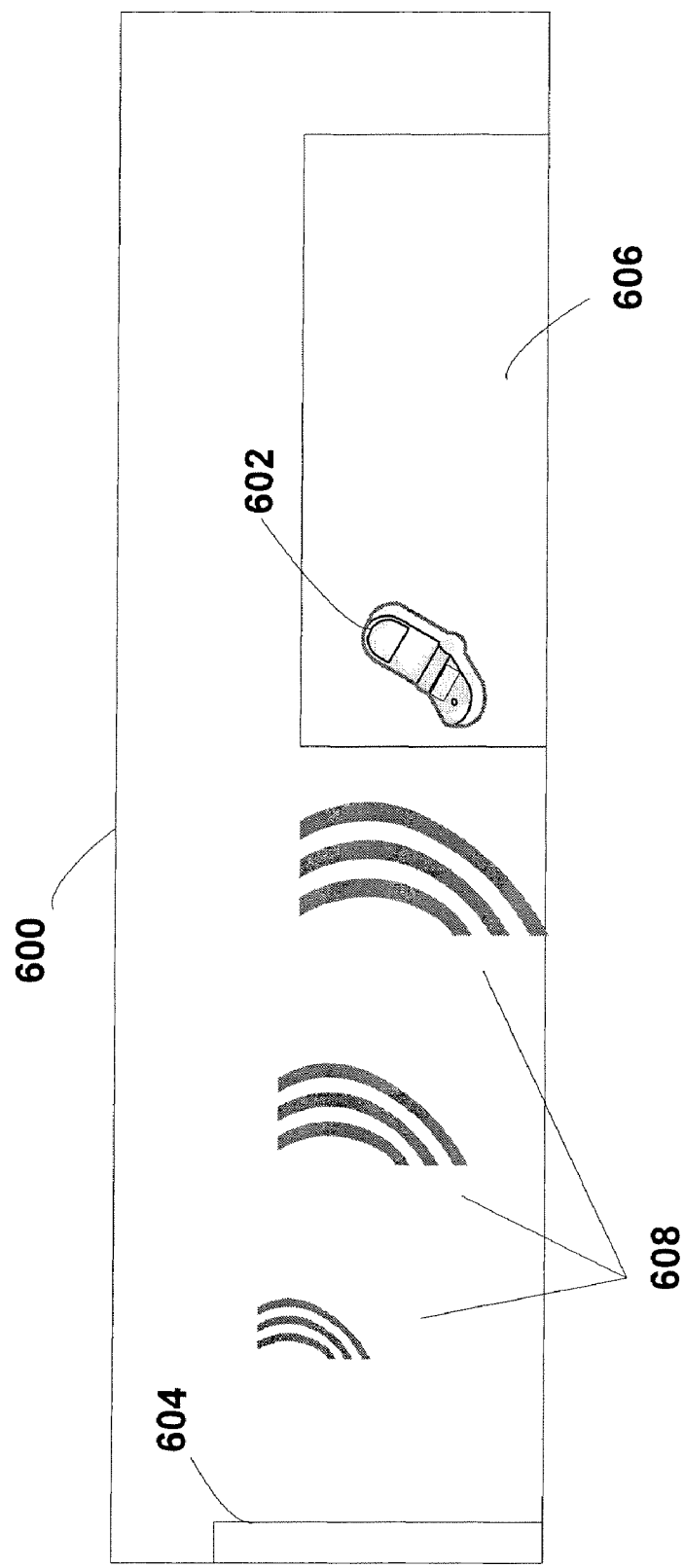
FIG. 6 is an exemplary and non-limiting diagram of a mobile security system in use to secure a room with a wireless device having an integrated detector.

FIG. 6 is illustrative of a setup to monitor a door for intrusive activity. A user may want to secure enclosure 600, which may be a dorm room, a house, or hotel room, against unauthorized entry through door 604. To secure the room, the user may, in addition to locking door 604 and taking other security measures, may wish to monitor any movement coming from door 604. For example, if the user is sleeping in room 600, the user may not be aware of a silent opening of door 604. Thus, the user may need a secondary means, other than their own senses, to detect the opening of door 604. The user thus places mobile security device 602 in a position on table to sense movement coming from door 604. Mobile security device 602 has a sensor, such as a type described above, which is positioned to detect movement from the door, preferable through passive reception of sound waves 608. Upon detection of movement, mobile security device 602 may be configured to sound an audible alarm and/or send a signal to a pre-determined location.

Figure 7:
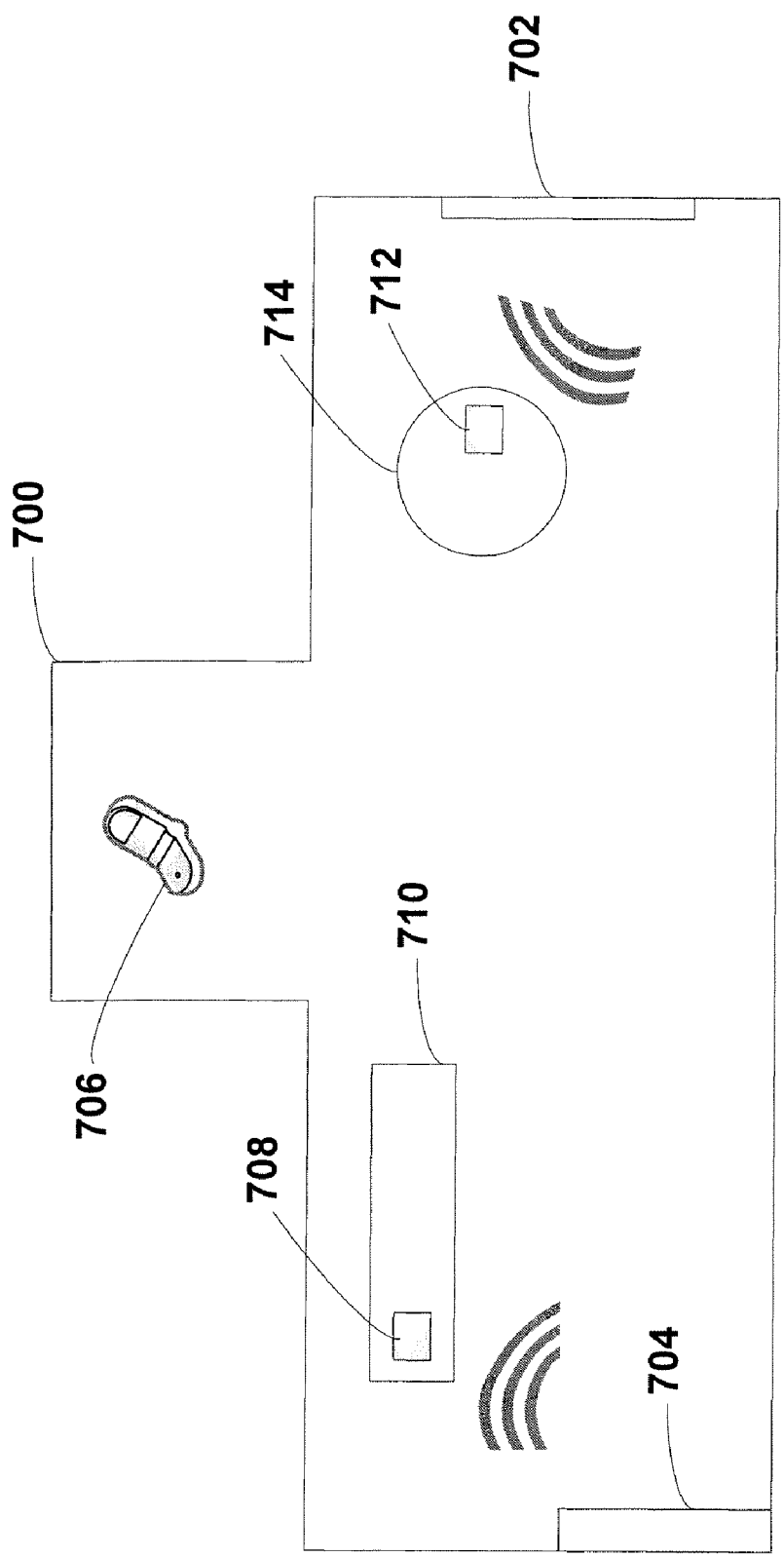
FIG. 7 is an exemplary and non-limiting diagram of a mobile security system in use to secure a room using a wireless device having a detached detector.

FIG. 7 is illustrative of an alternate mobile security arrangement using detached detectors. Shown is enclosure 700, which again may be of various types including a home, dorm room, etc. Enclosure 700, which for purposes of this explanation only is a room, may have door 704 and window 702. Unless mobile security device 706 is configured to have more than one integrated sensor capable of monitoring two or more areas, a feature within the scope of the present disclosure, it may be preferable to use two remote detectors to detect an intrusive event at both door 704 and window 702. Therefore, the user may place detector 708 on table 710 to monitor door 704 as well as detector 712 on table 714 to monitor window 702. Detectors 708 and 712 may be of various types, such as light, head, laser, infrared, microwave, etc., and may also communicate with mobile security device 706 through various communicative means, such as Bluetooth®, 802.x, radio, cellular, etc. Additionally, the detectors may also be in communication with each other, so if one detector senses an intrusive event, it sends a signal to the other detector to also alarm, thus creating redundancy.

The various techniques described herein may be implemented with hardware or software or, where appropriate, with a combination of both. Thus, the methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the disclosed embodiments. In the case of program code execution on programmable computers, the computer will generally include a processor, a storage medium readable by the processor (including volatile and non-volatile memory and/or storage elements), at least one input device, and at least one output device. One or more programs are preferably implemented in a high-level procedural or object-oriented programming language to communicate with a computer system. However, the program(s) can be implemented in assembly or machine language, if desired. In any case, the language may be a compiled or interpreted language and combined with hardware implementations.

The described methods and apparatus may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder, or the like, the machine becomes an apparatus for practicing the present disclosure. When implemented on a general-purpose processor, the program code combines with the processor to provide a unique apparatus that operates to perform the processing of the disclosed embodiments.

While the embodiments have been described in connection with the preferred embodiments of the various figures, it is to be understood that other similar embodiments may be used or modifications and additions may be made to the described embodiment for performing the same function without deviating therefrom. Therefore, the disclosed embodiments should not be limited to any single embodiment but rather should be construed in breadth and scope in accordance with the appended claims.

What is claimed:

1. A mobile security system comprising:
a mobile security device comprising a cellular transceiver, wherein the mobile security device is configured to communicate with a cellular network; and
a first detector detachable from the mobile security device configured to detect a first indication of an event, wherein the first detector is configured to communicate with the mobile security device, wherein the first detector is configured to send a first event signal indicative of the first indication of the event to the mobile security device if the first detector detects an event, wherein the first detector is configured to directly communicate with the mobile security device and indirectly communicate with the mobile security device.

2. The mobile security system of claim 1, wherein the mobile security device is one of a cellular telephone, a personal digital assistant, and a laptop computer.

3. The mobile security system of claim 1, wherein the first detector is detachable from the mobile security device.

4. The mobile security system of claim 1, wherein direct communication comprises the first detector transmitting the first event signal directly to the mobile security device, and wherein indirect communication comprises the first detector transmitting the first event signal to a cellular network, wherein the first event signal is thereafter transmitted to the mobile security device via the cellular network.

5. The mobile security system of claim 1, wherein the first detector is configured to detect at least one of sound, heat, light, infrared, or vibration.

6. The mobile security system of claim 1, wherein the first detector sends the first event signal using one of a Bluetooth, cellular, and 802.x wireless communication protocol.

7. The mobile security system of claim 1, wherein the event is one of motion and fire.

8. The mobile security system of claim 1, wherein the mobile security device further comprises a camera to record one of video and picture.

9. The mobile security system of claim 8, wherein the camera is configured to activate and begin recording when the first detector sends the first event signal to the mobile security device.

10. The mobile security system of claim 9, wherein the recording is stored on the mobile security device or transmitted to the cellular network.

11. The mobile security system of claim 1, further comprising a second detector, wherein the second detector is configured to send a second event signal to the mobile security device and the first detector if the second detector detects the event, wherein the first detector is configured to retransmit the second event signal to the mobile security device.

12. The mobile security system of claim 11, wherein the first detector is configured to detect fire and the second detector is configured to detect motion.

13. The mobile security system of claim 11, wherein the first detector and the second detector are configured to detect both motion and fire.

14. A mobile security apparatus capable of communicating with a cellular network, the mobile security apparatus comprising:
a cellular telephone comprising a detachable detector, wherein the detector is configured to detect an event, wherein the detector is further configured to generate an event signal if the detector detects an event, wherein the cellular telephone activates an alarm upon generation of the event signal, wherein the detector is configured to provide a direct communication with the mobile security apparatus and an indirect communication with the mobile security apparatus.

15. The mobile security apparatus of claim 14, wherein the detector is configured to detect at least one of sound, heat, light, infrared, or vibration.

16. The mobile security apparatus of claim 14, wherein the event is one of motion and fire.

17. The mobile security apparatus of claim 14, wherein the alarm is sound.

18. The mobile security apparatus of claim 14, further comprising a camera to record one of video and picture.

19. The mobile security apparatus of claim 18, wherein the camera is configured to activate and begin recording when the detector sends a signal to the mobile device.

20. The mobile security apparatus of claim 19, wherein the recording is stored on the mobile device or transmitted to the cellular network.

21. The mobile security apparatus of claim 14, wherein the cellular telephone is further configured to communicate the occurrence of the generated event signal to a central monitoring station.

22. The mobile security apparatus of claim 21, wherein the central monitoring station is configured to contact at least one of a fire department or a police station if the generated event signal is verified.

23. The mobile security apparatus of claim 14, wherein the cellular telephone is further configured to communicate the occurrence of the generated event signal to a second communication device.

24. The mobile security apparatus of claim 23, wherein the second communication device is one of a second cellular telephone, a computer, and a personal data assistant.

25. The mobile security apparatus of claim 23, wherein the communication of the occurrence of the generated event signal to a second communication device is one of email, text message, multimedia message, and a telephonic communication.

* * * * *